(No Model.)
C. R. SHEPLER.
CONDUIT FOR GAS OR OTHER FLUIDS.
No. 394,620. Patented Dec. 18, 1888.
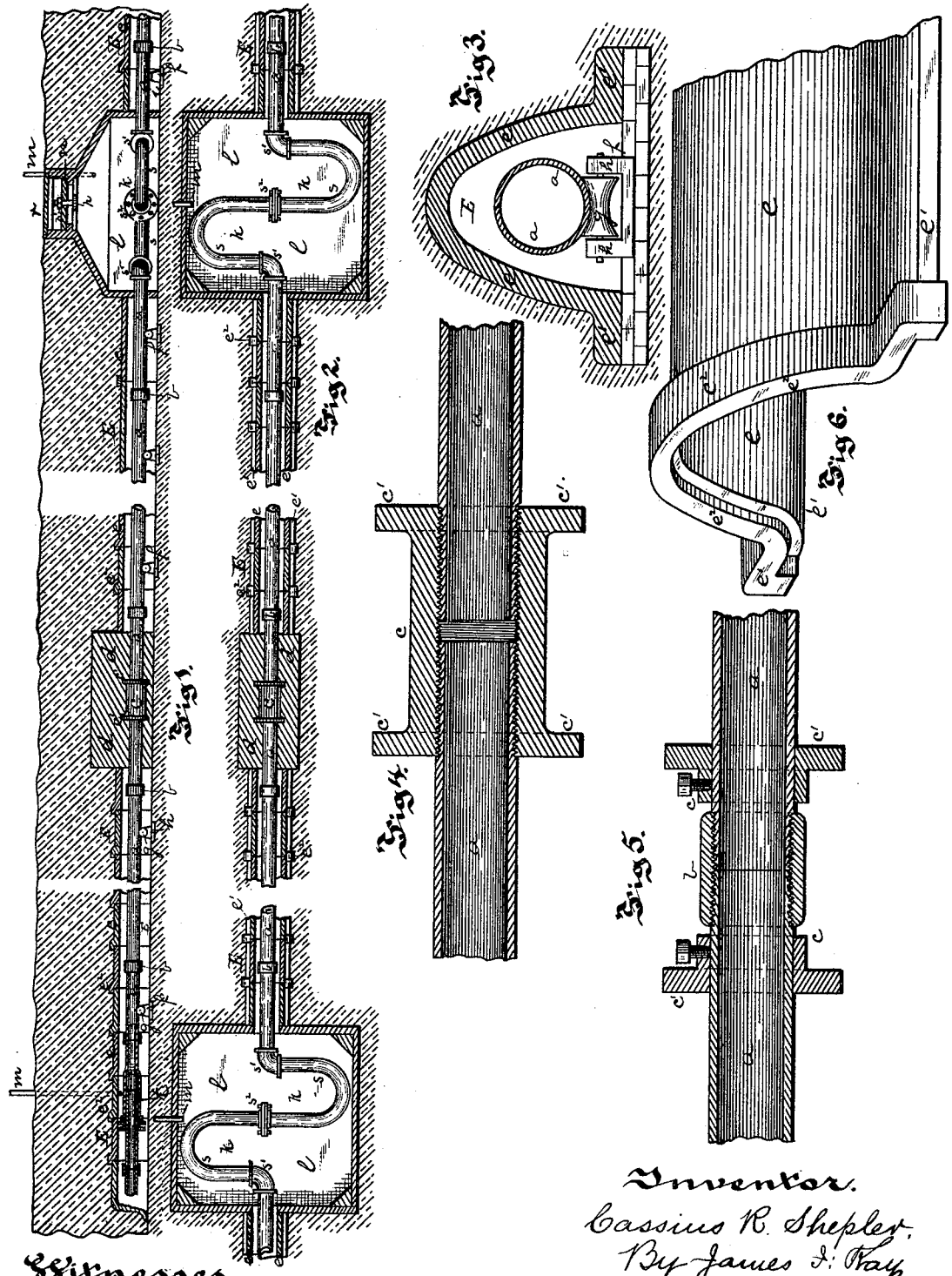

UNITED STATES PATENT OFFICE.

CASSIUS R. SHEPLER, OF PITTSBURG, PENNSYLVANIA, ASSIGNOR, BY DIRECT AND MESNE ASSIGNMENTS, TO GEORGE WESTINGHOUSE, JR., OF SAME PLACE.

CONDUIT FOR GAS OR OTHER FLUIDS.

SPECIFICATION forming part of Letters Patent No. 394,620, dated December 18, 1888.

Application filed January 22, 1885. Serial No. 153,625. (No model.)

*To all whom it may concern:*

Be it known that I, CASSIUS R. SHEPLER, of Pittsburg, in the county of Allegheny and State of Pennsylvania, have invented a new and useful Improvement in Conduits for Gas or other Fluids; and I do hereby declare the following to be a full, clear, and exact description thereof.

My invention relates to conduits for conducting gas through the streets of cities and towns, having special reference to conducting what is termed "natural gas," under high pressure, from the place of production to the place of distribution through low-pressure mains to the points of consumption. This gas is obtained at a pressure of from one hundred and fifty pounds to two hundred and fifty pounds to the square inch, and at these high pressures, as it is exceedingly rare and subtle, it is practically impossible to prevent its leakage through joints which are sufficiently tight to hold water, steam, and other fluids, and, as it has little or no odor or color, and when mixed with certain proportions of air forms an explosive, it is evident that means for conducting it safely through thickly-populated districts are very desirable. Among the difficulties heretofore found in holding the gas under high pressure are that the gas is low in temperature, its average temperature being about 40° Fahrenheit, and consequently causes the contraction of the tubing and the stripping of the threads and opening of the joints, and, as the pipes are surrounded by the earth and generally held thereby from longitudinal movement, this slight contraction acts to open and cause the leaking of many joints. Where the earth is not packed sufficiently tight to hold the pipes from longitudinal movement on account of the jarring of the fluid under pressure within the line, the line of tubing would often creep, and so bring extremely heavy strain on certain joints and cause them to open. The best means for conducting the gas heretofore suggested consist in surrounding the high-pressure main with a larger pipe, and thus collecting the gas escaping through the joints or through imperfections in the tubing, and connecting the high-pressure main with the surrounding low-pressure main by valves in such manner as to maintain a steady low pressure in the low-pressure main, the connections for consumption along the line being made with the low-pressure main. This did not, however, overcome the objections heretofore stated, and was extremely expensive, the outer pipe costing at least twelve thousand dollars per mile, and in case of serious leakage in the high-pressure main it was exceedingly hard to locate and to repair it. By my invention I am enabled to overcome all these objections.

My improvements will be hereinafter fully set forth and claimed.

In the accompanying drawings, forming part of this specification, Figure 1 is a vertical section illustrating my invention. Fig. 2 is a horizontal section. Fig. 3 is a cross-section. Figs. 4 and 5 are views of different forms of anchors, and Fig. 6 is a view of the most approved form of housing-sections.

Like letters of reference indicate like parts in each.

The line of tubing illustrated is formed of sections or lengths $a$ of threaded wrought-metal tubing joined by the coupling-sockets $b$. The conduit is laid in the ordinary trench below frost-line, and at suitable intervals—as, for example, every two thousand feet, I employ an anchor, $c$, the anchor being preferably formed of a cast-metal coupling having large flanges $c'$, around which the surrounding filling of earth or other material is packed, thus preventing the movement of the anchor or line of tubing of which it forms a part. The anchor may be simply an annular plate bolted or shrunk upon the tubing, as shown in Fig. 5, its object being to hold the line of tubing from longitudinal movement at that point, and any means suitable for this purpose being included.

I prefer to surround the tubing at the place anchored with a large mass or bed of concrete, $d$, as shown, the concrete becoming set around the anchor and tubing and thus holding it, and also preventing the escape of the gas therefrom. The concrete may itself act as an anchor without the employment of any enlargement on the tubing. Fitting close against and extending from each side of this anchorage is the housing-chamber E, within which the line of tubing is supported, the walls of this chamber being of any suitable construction which will form a suitable space or chamber at the sides of and above the gas main or pipe, and being preferably of the form shown in Fig. 3, and being formed of sections having the flanges $e'$ resting on the bottom of the trench, and the body $e$ having the form of an arch to sustain the superincumbent weight of the earth. The sections are generally formed of terra-cotta suitably glazed, the sections being four or more feet in length, connected by sockets $e^2$, suitably luted. They may, however, be used without the socket-joints, their edges being packed with the luting and held in place by the surrounding earth. This housing so formed has the advantage of cheapness and indestructibility. The housing-sections may also be formed of wood or other material; but they are more expensive. It is not necessary that the connections between the housing-sections be absolutely gas-tight, or, indeed, to provide them with any base whatever, as any escaping gas has an easy means of escape and no pressure whatever is maintained within the housing-chambers. They are preferably made large enough to permit a workman to pass through them along the line of tubing for its examination and repairs. The housing-chambers are provided at intervals with the escape-boxes $l$, which are generally located midway between the anchors $c$, and any escaping gas passes from the housing-chambers into these boxes, and thence through the vent-pipes $m$, which may be carried to any desired height above the street-level, the vent-pipes generally leading from the side of the escape-boxes to the street-curbing before rising through the ground. The escape-box has a man-hole at the top closed and sealed by the plate $n$, clamped in place by the bolt $p$ and nut $p'$, and covered by the cover plate or grating $r$, thus giving access to the escape-box. The line of tubing rests within the housing-chamber upon suitable supports, $f$, preferably anti-friction rollers $g$, mounted in bearings $h$ on the base of the trench, though smooth-faced plates may be employed, as at $i$, their purpose being to so support the line of tubing as to permit of its free longitudinal movement thereon in case of contraction or expansion. The supporting-faces of the rollers or plates correspond in curve to the tubing to give a large bearing therefor. These supports are employed at intervals of sixteen to forty feet. At suitable intervals, preferably midway between the anchors $c$, within the escape-boxes $e$, are the expansion-joints $k$, which allow of longitudinal movement of the pipe-line.

The form of expansion-joint preferred by me is shown in Fig. 2, being formed of two bent pipes, $s\ s$, formed of copper or other material capable of bending, and so allowing of the longitudinal movement of the pipe-line, and connected to the pipe-lines by elbow-joints $s'$ and connected together by the flange-joints $s^2$. Other forms of expansion-joints—such as that shown at $t$, Fig. 1—may be employed, though a sliding joint is more liable to leakage. Where this form of expansion-joint is employed the escape-boxes are not necessary, the vent-pipes leading directly from the housing-chambers, as at $m'$. These joints should be employed at intervals of not over two thousand feet, and should permit of a movement of about six inches.

When the conduit is in use, the gas passing through causes the contraction and expansion of the line of tubing, according to the temperature of the gas or other fluid and to its pressure and travel therein, causing also the jarring of the line of tubing, as before referred to. As the pipe-line is anchored at intervals, it is thus held from creeping, and the movement of the pipe is confined between the anchors. As the pipes are unconfined between these points and rest on supports offering little or no resistance to their longitudinal movement, any expansion or contraction is taken up by the expansion-joints, the pipe-couplings being thus entirely relieved from strain, and substantially all liability of the opening of the joints and escape of the gas being overcome. In case of leakage of the gas it will be confined within the housing-chambers, and, as free escape is provided through the vent-pipes, it will naturally flow through the chambers to the points of escape and pass out, there being no pressure within the housing-chambers. The amount of leakage can be tested by means of a gage attached to the escape-pipe, and where it indicates too great leakage the escape-box may be opened and the line of pipe examined and repaired. The increased cost is not large, as the housings are inexpensive.

I am aware that the combination of an underground gas-main and an arched covering therefor is not new, and therefore do not claim the same.

What I claim as my invention, and desire to secure by Letters Patent, is—

1. In a conduit for gas and like fluids, the combination of a housing-chamber closed at the ends, an escape-pipe leading therefrom, and a line of tubing extending through said chamber and anchored at the ends thereof, and provided with an expansion-joint, substantially as and for the purposes set forth.

2. In a conduit for gas, the combination of a housing-chamber having an escape-box therein and a vent-pipe leading from said box, and a line of tubing extending through said chamber and anchored at the ends thereof, and provided with an expansion-joint within said escape-box, substantially as and for the purposes set forth.

3. In lines of tubing, an anchor secured to the tubing and provided with a broad projecting flange presenting a bearing-surface substantially perpendicular to the axis of the line, in combination with a bed of concrete surrounding the anchor and forming end abutments for its flange, substantially as and for the purposes set forth.

4. In conduits for gas and other fluids, a line of tubing anchored at intervals by a bed of concrete, in combination with housing-chambers fitting against and extending from said concrete bed and over said tubing, and having vent-pipes leading therefrom, substantially as and for the purposes set forth.

In testimony whereof I, the said CASSIUS R. SHEPLER, have hereunto set my hand.

CASSIUS R. SHEPLER.

Witnesses:
JAMES I. KAY,
J. N. COOKE.